United States Patent Office 2,892,686
Patented June 30, 1959

2,892,686

CONVERSION OF HYDROGEN IODIDE TO IODINE

Charles R. Greene, Berkeley, and Shelton E. Steinle, Richmond Annex, Calif., assignors to Shell Development Company, New York, N.Y., a corporation of Delaware No Drawing. Application October 26, 1956
Serial No. 618,456

8 Claims. (Cl. 23—216)

This invention relates to a process for recovering elemental iodine from hydrogen iodide. More particularly, this invention relates to a process for oxidizing hydrogen iodide to iodine, employing molecular oxygen as the oxidizing agent, in the presence of a catalyst.

We have discovered that the rate at which hydrogen iodide reacts with molecular oxygen is markedly increased by conducting the reaction in the presence of a solid material which has substantial intrinsic surface acidity. Thus, we have found that substantially complete conversion of hydrogen iodide to iodine can be effected at very high rates at temperatures of about 300° C. or less by reacting hydrogen iodide with molecular oxygen in the presence of a solid material having a substantial intrinsic surface acidity.

Further, we have found that these acidic solid materials effectively catalyze the reaction of hydrogen iodide with molecular oxygen whether the reaction is carried out in the vapor phase, or in the liquid phase.

Our discovery thus provides basis for a highly flexible, practical process for converting hydrogen iodide to iodine. In its broad aspect, this new process comprises intimately contacting a molecular oxygen-containing gas with hydrogen iodide in the presence of a solid material having a substantial surface acidity and thereafter recovering the product iodine from the reaction zone.

The use as catalyst of a solid material having "substantial intrinsic surface acidity" constitutes the fundamental basis of the new process. By this is meant solid materials which in and of themselves exhibit protonic surface activity. Not included are solid materials which are or may be acidic on their surface because of the presence of a strong mineral acid adsorbed or absorbed on that surface.

It has been found that the intrinsic surface acidity of a solid material can be expressed in terms of an acidity function, usually designated $H_0$. See Hammett, "Physical Organic Chemistry," McGraw-Hill, 1940, pages 266 et seq., and Hine, "Physical Organic Chemistry," McGraw-Hill, 1956, at pages 59–61. The intrinsic surface acidity of a solid material is usually expressed by a numerical value given by the equation.

Intrinsic surface acidity $= H_0 = pK_A + \log \frac{(C_B)}{(C_{BH^+})}$ in which $pK_A$ is the acid ionization constant for the conjugate acid $BH^+$ of a neutral base (i. e., proton acceptor) B, $C_B$ is the concentration of the base, B, and $C_{BH^+}$ is the concentration of the conjugate acid, $BH^+$, referred to dilute aqueous solutions. It will be seen that the intrinsic acidity of an acid is numerically equal to the acid ionization constant for the conjugate acid of the neutral base when one half is in the form of the conjugate acid $BH^+$ and one half is in the form of the base B. It has been found that the numerical value for the $pK_A$ can be determined through the use of a neutral base of suitable basicity which shows a visible change of color upon neutralization with the acidic solid material. Thus, the numerical value for the $H_0$ of a given material can be determined by applying to it a small amount of a solution in an organic solvent of an indicator having a previously determined $pK_A$ value and observing the color of the solid containing the adsorbed indicator compound. This technique for determining the intrinsic surface acidity of a solid material is described generally in Hammett, supra, beginning at page 271, and both the theoretical basis for the use of the technique, and a detailed description of the technique is given in copending application Serial No. 387,512, filed October 21, 1953 which matured into U.S. Patent No. 2,868,688, issued January 13, 1959. The pertinent disclosures of copending application Serial No. 387,512, relating to the meaning and determination of the intrinsic surface acidity of a solid material, are hereby specifically incorporated into and made a part of this description of our invention.

It has been found that for a solid material to be effective as a catalyst for the reaction of hydrogen iodide with molecular oxygen, the intrinsic acidity of that material must correspond to a $H_0$ of less than about 2.0. It has also been found that the higher the intrinsic acidity of a material, i.e., the lower (more negative) its $H_0$, the better catalyst that material will be. It is preferred that the intrinsic acidity of the solid material used as catalyst correspond to a $H_0$ of less than about 0.0.

Because of their availability and stability the argillaceous materials having substantial intrinsic surface acidity as defined above are preferred as the catalyst. By "argillaceous" material is meant any material, natural or synthetic, which has the properties commonly associated with clays, clayey materials and/or the ceramic materials resulting from sintering, calcining or otherwise heat treating natural clays or clayey materials, or synthetic mixtures of silica (usually in the form of a gel) and alumina, magnesia, zirconia, or other materials. Thus, the term "argillaceous material" includes the naturally occurring clays, such as the montmorillonite clays, the kaolinite clays, the attapulgite clays, the hydrated micas, and the like. Also included are the chemically and/or physically modified natural clays, such as the activated natural clays, the acid-leached natural clays, and natural clays which have been subjected to heat treatment, such as sintered clays, calcined clays, and the like, and natural clays which have been subjected to a combination of physical and chemical treatments. The term "argillaceous material" also includes the various synthetic materials which have the characteristics of natural clays or the ceramic materials derived therefrom. These claytype materials consist largely of silica and/or alumina and/or magnesia, and are often modified by inclusion of minor amounts of such materials as $B_2O_3$, $ZrO_2$, and the like. These synthetic materials ordinarily are available in the form of hard particles or granules, prepared by heat treatment of intimate mixtures of the various components. The term "argillaceous material" also is intended to include substantially pure alumina and silica, whether in natural form, such as in bauxite, or chemically pure $Al_2O_3$ or $SiO_2$, provided the form of these materials is such that they have a substantial intrinsic surface acidity. The argillaceous material per se may be used as the catalyst, or there may be used a composite solid catalyst in which the argillaceous material is but one component, and may be either the major component, or but a minor component of that composition.

In general, argillaceous materials suitable as catalyst for the reaction of hydrogen iodide with molecular oxygen are those argillaceous materials which are known to be catalysts for the cracking of hydrocarbons. Natural clays suitable for this purpose thus include the kaolinite clays, such as kaolinite, nacrite, dickite and anauxite, the attapulgite clays, such as attapulgite and sepiolite, the montmorillonite clays, such as montmorillonite, saponite, montronite and beidelite, and other silicates, such as talc, mica, and pyrophillites which have been suitably treated (chemically, physically or both chemically and physically) to prepare them for use as hydrocarbon cracking catalysts. Synthetic clay-type cracking catalysts also are suitable, including the various combinations chosen from silica, alumina, zirconia, boria and/or magnesia. The combinations of silica with alumina and silica with magnesia are of particular interest. The activated forms of silica and alumina also may be used as the catalyst.

The new process is effective for converting hydrogen iodide to iodine regardless of the source of the hydrogen iodide. That is to say, pure hydrogen iodide may be used in the new process, or the hydrogen iodide may be merely one component of a mixture of compounds. From the standpoint of practical operating efficiency, it is desirable, of course, that the hydrogen iodide concentration in the reaction zone be as high as economically feasible.

The conversion of hydrogen iodide to iodine may be carried out in the vapor phase, or it may be carried out in the liquid phase. Where the conversion is carried out in the vapor phase, and the hydrogen iodide is but one component of a mixture of gases, the part of the mixture other than hydrogen iodide may be composed of any material or materials which are substantially inert in the reaction zone. Thus, inert diluents such as nitrogen, helium or other of the inert gaseous elements, carbon dioxide, or other inert gaseous inorganic compounds, or the like, may be present. Also, there may be present gaseous organic materials which are not reactive with any one or all of hydrogen iodide, iodine, water, or molecular oxygen in the presence of an acidic solid material at the temperatures employed. It has been found that the presence of substantial amounts of either or both of water and iodine in the mixture to be treated will not adversely affect the conversion of hydrogen iodide to iodine, despite the fact that it might be expected that, since both compounds appear on the right-hand side of the reaction equation, the presence of either or both of water or iodine might inhibit or limit the desired reaction.

The conversion of hydrogen iodide to iodine according to our discovery also may be carried out in liquid phase. Thus, liquid hydrogen iodide may be oxidized to iodine by this new process. In most cases, however, it will be more convenient to dissolve the hydrogen iodide in water and subject this aqueous solution to contact with molecular oxygen according to the new process. The presence of aqueous water does not appear to inhibit the desired reaction significantly. Also, the presence of substantial amounts of iodine in the reaction mixture does not appear to inhibit or limit the desired reaction. However, it may be desirable to limit the amount of iodine in the reaction mixture. It is preferred that where iodine is present the molar ratio of iodine to hydrogen iodide not exceed one.

Molecular oxygen from any source may be used. Thus, pure molecular oxygen is suitable, as are mixtures of molecular oxygen with other gases, such as commercially pure (95%) oxygen, oxygen-enriched air, or air itself.

Where conversion of the hydrogen iodide is to be effected in the vapor phase, the amount of molecular oxygen used preferably is at least the amount theoretically required to convert all of the hydrogen iodide present in the reaction zone to iodine. In some cases, it may be found convenient and desirable to use somewhat less than the theoretical minimum amount of molecular oxygen. Generally, however, to insure maximum conversion of hydrogen iodide to iodine, it is desirable that the amount of molecular oxygen fed be moderately in excess of the theoretical minimum. In such cases, the excess of oxygen should amount to at least 10% over that theoretically required, and it is preferred that at least a 50% excess of oxygen be present in the reaction zone. A large excess of oxygen is not necessary, and in most cases will be undesirable because it is uneconomical. Usually, little advantage will accrue from the use of more than about a 500% excess of oxygen, and in most cases it is preferable that the amount of oxygen exceed the amount theoretically required to oxidize all of the hydrogen iodide present by from about 50% to about 350%. When air or other source of molecular oxygen containing an inert diluent gas is used, precaution should be taken to insure that there is a substantial proportion of each of hydrogen iodide and molecular oxygen in the reaction zone.

Where the conversion of hydrogen iodide to iodine is to be effected in the liquid phase, somewhat greater excesses of molecular oxygen usually are required than when the conversion is to be carried out in the vapor phase. Thus, it normally will be found necessary, when conducting the reaction in the liquid phase, to maintain at least about a 25% excess of molecular oxygen in the reaction zone, and in some cases as much as a 200-fold excess of oxygen will be found desirable. Preferably, the excess of oxygen is at least 50%; an excess of more than about 100-fold is not often required, for such large excesses provide little advantage over somewhat lesser excesses and are usually uneconomic and present operating difficulties.

When operating in the liquid phase, it is essential to the effective oxidation of hydrogen iodide that there be a substantial partial pressure of molecular oxygen in the reaction zone. Thus, the oxygen partial pressure should be at least 10 p.s.i., and optimum oxidation rates are usually obtained only when the oxygen partial pressure is 20 p.s.i. or more. While much higher oxygen partial pressures may be used—for example, up to 200 p.s.i. or even more—in general, little added advantage results from the use of oxygen partial pressures in excess of about 100 p.s.i.

A primary factor in effecting the reaction between hydrogen iodide and molecular oxygen in the presence of a liquid phase at practical rates is the maintenance of intimate contact between the gas and liquid phases; practical reaction rates can be obtained only when a very high degree of contact between the gas and liquid phases is maintained. Means for obtaining and maintaining intimate contact between gases and liquids are well known in the art. Any of the known methods may be used in the process of this invention. For example, the reaction mixture may be stirred or otherwise thoroughly agitated, or the liquid materials may be passed in countercurrent flow to the gaseous materials in a tower packed with an inert packing or the catalyst, or in a tower equipped with devices for insuring intimate gas-liquid contact, including towers equipped with grid trays, bubble plates, rotary disc contactors or the like. The particular method chosen should be, of course, capable of effecting the necessary degree of contact in the presence of the solid catalyst. The catalyst may be in the form of a fine powder, or in granular form, as may be most convenient and effective.

The conversion of hydrogen iodide to iodine is effected at any temperature above about 50° C.; however, the reaction rate increases significantly with temperature. When operating in the vapor phase, the minimum temperature is determined by one of two factors: first, if it is desired that the product iodine be obtained in liquid phase, it will, of course, be necessary to conduct the reaction at a temperature above the melting point of iodine (113.5° C.); second, if there is present in the reaction zone any material which condenses at a temperature above the melting point of iodine, or if it is desired to recover the product iodine as a solid and there is present in the reaction zone any material which condenses at any temperature above about 50° C., then the dewpoint of the material which will so condense fixes the minimum reaction temperature. From the standpoint of the reaction of hydrogen iodide with molecular oxygen to form iodine, per se, there is no maximum limit on the temperature at which the reaction may be conducted. However, temperatures above about 400° C. will not be required, for at this temperature level, and in most cases, at temperatures substantially below this level, the reaction of hydrogen iodide with molecular oxygen proceeds at very high rates. Practically satisfactory reaction rates are obtained at temperatures substantially below 400° C., for example, at temperatures of from about 100° C. to about 300° C. Because of the substantial advantages obtained, from the standpoint of corrosion and the useful materials of construction available, by conducting the reaction at as low a temperature as possible consistent with a feasible reaction rate, reaction zone temperatures of from about 100° C. to about 250° C. are most suitable. When operating in the liquid phase, the maximum temperature is, of course, that of the boiling reaction mixture at the pressure used. It is normally desirable to conduct the reaction at temperatures somewhat lower than that at which the reaction mixture boils, since boiling mixtures do not absorb gases (in this case, molecular oxygen) readily. Preferably, when the reaction is carried out in the liquid phase, the temperature is at least about 80° C.

The conversion of hydrogen iodide to iodine in the vapor phase may be carried out at any pressure. Operation at substantially atmospheric pressure is quite practical, and in a great many cases will be found to be the most convenient operating pressure. Few, if any, substantial advantages are obtained by operating at reduced pressure, but in many cases, it will be found both convenient and desirable to conduct the reaction at moderately elevated pressures. For example, pressures of up to about 500 p.s.i.g. may be used to reduce the volume of gases to be handled. Where the conversion is carried out in the liquid phase, the minimum pressure which can be used normally will be determined by the oxygen partial pressure desired. If pure oxygen is used, the system pressure need not be substantially greater than the oxygen partial pressure used. If air, or other mixture of oxygen with an inert gas is used, then the system pressure will be correspondingly greater to furnish the requisite oxygen partial pressure. In some cases, the use of elevated pressures may be desirable to reduce the volume of gases handled and/or to increase the boiling temperature of the hydrogen iodide solution in the reaction zone. Pressures in excess of about 500 p.s.i.g. will seldom be found advantageous or desirable, as compared to somewhat lower pressures.

At the temperatures set out above, practically feasible hydrogen iodide conversion levels are obtained in a few seconds reaction time. For example, when operating in the vapor phase, at temperatures of from about 150° C. to about 200° C., using typical acidic argillaceous materials as catalyst, substantially quantitative conversion of hydrogen iodide to iodine is effected at residence times of the magnitude of about 1 to about 10 seconds. At higher temperatures, the required residence time is correspondingly lower. When operating in the liquid phase, with adequate means for insuring intimate contact between the gas and liquid phases in the reaction zone, substantially complete reaction is obtained in from about 30 to about 60 minutes.

Recovery of the product iodine from the effluent from the reaction zone may be effected by known methods, the method used depending upon whether the conversion of hydrogen iodide to iodine was effected in the liquid phase or in the vapor phase, upon the extent to which the hydrogen iodide was converted to iodine, and upon the nature of the components of the effluent other than iodine, water and hydrogen iodide, if any be present. If the conversion of hydrogen iodide to iodine is substantially 100%, and the conversion of hydrogen iodide was effected in aqueous liquid phase, the product iodine is immiscible with the aqueous phase and the two phases may be separated by decantation where the iodine is liquid, or by filtration, centrifuging or the like, where the iodine is solid. If the conversion of hydrogen iodide to iodine is substantially 100%, and the conversion of the hydrogen iodide to iodine was effected in vapor phase, the iodine may be recovered most simply by cooling the effluent vapors to form liquid water and liquid or solid iodine, from which the iodine is recovered by phase separation as where the hydrogen iodide conversion was carried out in aqueous liquid phase. Where the conversion of the hydrogen iodide is incomplete, the effluent will contain both iodine and hydrogen iodide. Where the conversion of hydrogen iodide was carried out in aqueous liquid phase, or in the aqueous liquid phase resulting from condensation of the effluent vapors where the conversion of hydrogen iodide was carried out in the vapor phase, the hydrogen iodide and, to a certain extent, the iodine will be dissolved in the aqueous phase. In many cases it will be found possible to so control the degree of hydrogen iodide conversion and the amount of water present in the effluent so that the amount of iodine formed exceeds substantially the amount of iodine which will dissolve in the hydrogen iodide solution obtained from the effluent. This permits direct removal of a substantial part of the product iodine by simple phase separation. The iodine dissolved in the hydrogen iodide solution may be recovered by treating the solution with a strong oxidizing agent, such as chlorine, to convert the remaining hydrogen iodide to iodine, and the iodine is separated from the water by simple phase separation. Alternatively, the iodine dissolved in the hydrogen iodide solution may be recovered by passing an inert gas through the solution and recovering iodine from the effluent gases. This method for selectively removing iodine from mixtures of iodine, hydrogen iodide and water is disclosed and claimed in copending application Serial No. 594,893, filed June 29, 1956. Where the oxidation of hydrogen iodide is conducted in the liquid phase, this method may be used to advantage to recover iodine directly from the reaction mixture. Thus, it will be found that if a part of the gaseous portion of the reaction mixture be removed from the reaction zone, the gaseous material contains iodine and water, but no hydrogen iodide. Recovery of the iodine content of such mixtures is easily effected by the methods already set out herein.

This constitutes a general description of the process of the invention; the following examples illustrate specific applications of this process. It is to be understood that these examples are for the purpose of illustration only and that the invention is not to be regarded as limited in any way to the specific conditions cited therein.

*Example 1*

A vaporous mixture of 27.5% by weight hydrogen iodide and 72.5% by weight water was mixed with sufficient air to provide twice as much molecular oxygen as would theoretically be required to react with all of the hydrogen iodide and the entire mixture was continuously passed through a tubular reactor packed with a modified clay-bonded calcined diatomaceous earth. This catalyst was prepared by digesting a commercially available clay-bonded calcined diatomaceous earth material designated by the manufacturer, Johns-Manville Company, as "Celite VIII" for 16 hours under reflux with 25% by weight sulfuric acid. The amount of acid used was 1.5 times the bulk volume of the carrier. The leached catalyst was then drained, washed thoroughly with water, and dried in an oven at 110° C. The material has an intrinsic surface acidity corresponding to an $H_0$ of from −3 to −5.5. The catalyst was in the form of pellets 5/32 inch in diameter and 1/4 inch long. The temperature of the catalyst bed was so maintained that the temperature of the effluent gases was 135° C. The apparent residence time was one second. There was a conversion of 95% of the hydrogen iodide to iodine. When the reaction temperature was raised to 145° C., 97% of the hydrogen iodide was converted to iodine.

*Example II*

A vaporous mixture of 23% by weight hydrogen iodide, 12% by weight iodine and 65% by weight water was mixed with sufficient air to provide ten percent more molecular oxygen than would theoretically be required to react with all of the hydrogen iodide. The entire mixture was continuously passed through a tubular reactor packed with a modified clay-bonded calcined diatomaceous earth. This catalyst was prepared by treating a commercially available clay-bonded calcined diatomaceous earth material designated by the manufacturer, Johns-Manville Company, as Celite VIII, as follows:

The diatomaceous earth material, 100 parts, in the form of pellets which had a generally cylindrical shape and measured approximately 5/32 by 3/16 inch, was soaked for approximately one hour, and at room temperature, in an excess of an aqueous solution of phosphoric acid containing 85% by weight $H_3PO_4$. The excess acid was then removed by allowing the carrier material to drain for one hour. The impregnated carrier material was then placed in an oven and heated at 300° C. for 3 hours, the pressure being atmospheric, and the atmosphere surrounding the carrier material containing a partial pressure of water equal to approximately 200 mm. Hg. The material was then cooled and leached by digesting the material for one hour with acidified water maintained at 100° C. The water had an initial pH of 0.35, the acidity being furnished by the addition of sulfuric acid. The volume ratio of water to carrier material was approximately 1.5. The carrier material was then drained and the leaching repeated in an identical manner, using a fresh portion of acidified water.

The acidified water was then drained from the material and the leaching repeated twice more, following the same procedure, but substituting pure water for the acidified water.

The carrier material was drained, and dried in an oven at about 125° C. The product had an intrinsic surface acidity corresponding to an $H_0$ of +1.5 to −3.5. The temperature of the catalyst bed was so maintained that the temperature of the effluent gases was 150° C. The apparent residence time was 0.9 second. There was a conversion of 38.6% of the hydrogen iodide to iodine.

*Example III*

A vaporous mixture of 27.5% hydrogen iodide and 72.5% water was passed with an amount of air providing a 200% excess of molecular oxygen over a bed of a commercially available bauxite catalyst maintained at a temperature of 127° C. Hydrogen iodide in an amount of 55% was converted to iodine at a residence time of one second. Substantially quantitative conversion of the hydrogen iodide was obtained in one second at a temperature of 157° C. The catalyst used was a form of activated bauxite marketed under the trade name "Porocel-S" by Attapulgus Clay Company. It had an intrinsic acidity corresponding to an $H_0$ of from about +1.5 to about −3.0. It had an approximate analysis: alumina, 91.3% by weight; silica, 7.2% by weight; titania, 1.5% by weight; 6.0% volatile matter. It had a surface area of 200–220 square meters per gram. The catalyst particles would pass through an 8-mesh screen, but were held up on a 14-mesh screen.

*Example IV*

Hydrogen iodide was oxidized to iodine in the liquid phase by the following procedure. (In this description, parts by weight bear the same relationship to parts by volume as does the kilogram to the liter.)

A solution, 20 parts by volume, of 20% by weight hydrogen iodide in water was placed in an autoclave equipped with a stirrer. There was added 1% by weight of a commercial silica-alumina cracking catalyst. The mixture was stirred and brought to 105° C. Pure oxygen was charged to the autoclave to maintain a constant pressure of 60 p.s.i.g. (the oxygen partial pressure in the autoclave was about 55 p.s.i). The mixture was stirred constantly and thoroughly, and held at 105° C. At intervals, samples of the mixture were taken and analyzed. The following results were obtained:

| Time After Beginning of Run at Which Sample was Taken (minutes) | Percent HI Converted to $I_2$ |
|---|---|
| 0 | 0 |
| 5 | 15 |
| 10 | 35 |
| 20 | 66 |
| 30 | 82 |
| 40 | 91 |

The catalyst was a microspheroidal silica-alumina hydrocarbon cracking catalyst marketed by American Cyanamid Company under the designation Aerocat Synthetic Fluid Cracking Catalyst, Grade MS-A-2. This catalyst has the composition (dry basis): 13.3% by weight alumina; 86.65% by weight silica, 0.04% by weight iron; and 0.01% by weight sodium (as $Na_2O$). It has a surface of 650 square meters per gram. It has an average particle size of 59 microns, no particles greater than 40-mesh, and 98% of particles which pass through a 100-mesh screen. Before the catalyst was used, it was calcined at 450° C. for four hours, then cooled before use. The intrinsic surface acidity of the catalyst corresponded to an $H_0$ of less than −8.2.

We claim as our invention:

1. A process for oxidizing hydrogen iodide to iodine which comprises reacting hydrogen iodide and molecular oxygen at a temperature of at least about 50° C. in the presence of an argillaceous material having an intrinsic surface acidity ($H_0$) of less than about 2.0, said argillaceous material being the sole catalyst.

2. A process for oxidizing hydrogen iodide to iodine which comprises reacting hydrogen iodide with molecular oxygen at a temperature of from about 50° C. to about 400° C. in the presence of an argillaceous material having an intrinsic surface acidity ($H_0$) of less than about 2.0 as sole catalyst.

3. A process for oxidizing hydrogen iodide to iodine which comprises passing a gaseous mixture comprising hydrogen iodide and molecular oxygen in intimate contact with an argillaceous material having an intrinsic surface acidity ($H_0$) of less than about 2.0 as sole catalyst maintained, at a temperature of from about 50° C. to about 400° C., and recovering iodine from the effluent gases.

4. A process for oxidizing hydrogen iodide to iodine which comprises passing a gaseous mixture comprising hydrogen iodide and molecular oxygen in intimate contact with a catalyst consisting of an argillaceous material having an intrinsic surface acidity ($H_0$) of less than 0.0 maintained at a temperature of from about 50° C. to about 400° C., and recovering iodine from the effluent gases.

5. A process for oxidizing hydrogen iodide to iodine which comprises intimately contacting at a temperature of at least about 50° C. an aqueous solution of hydrogen iodide with a molecular oxygen-containing gas in the presence of an argillaceous material having an intrinsic surface acidity ($H_0$) of less than about 2.0 as sole catalyst, the partial pressure of molecular oxygen in the reaction zone being at least ten pounds per square inch.

6. A process for oxidizing hydrogen iodide to iodine which comprises reacting hydrogen iodide and molecular oxygen at a temperature of at least about 50° C. in the presence of a modified clay-bonded diatomaceous earth material having an intrinsic surface acidity ($H_0$) of less than about 2.0 as sole catalyst.

7. A process for oxidizing hydrogen iodide to iodine which comprises reacting hydrogen iodide and molecular oxygen at a temperature of at least about 50° C. in the presence of an activated bauxite having an intrinsic surface acidity ($H_0$) of less than about 2.0 as sole catalyst.

8. A process for oxidizing hydrogen iodide to iodine which comprises reacting hydrogen iodide and molecular oxygen at a temperature of at least about 50° C. in the presence of a silica-alumina hydrocarbon cracking catalyst having an intrinsic surface acidity ($H_0$) of less than about 2.0 as sole catalyst.

References Cited in the file of this patent

UNITED STATES PATENTS

| | | |
|---|---|---|
| 1,331,175 | Meyers | July 29, 1919 |
| 2,312,952 | Balcar | Mar. 2, 1943 |
| 2,395,314 | Blumer | Feb. 19, 1946 |
| 2,547,928 | Davis et al. | Apr. 10, 1951 |

OTHER REFERENCES

Thorpe: "Dictionary of Applied Chemistry," vol. II, pp. 18–19 (1912), publ. by Longmans, Green and Co., New York, N.Y.

Latimer: "Reference Book of Inorganic Chemistry," 3rd ed., p. 165 (1951), The MacMillan Co., New York, N.Y.